(No Model.)
J. W. SPRIEGEL.
NUT LOCK.
No. 545,742. Patented Sept. 3, 1895.
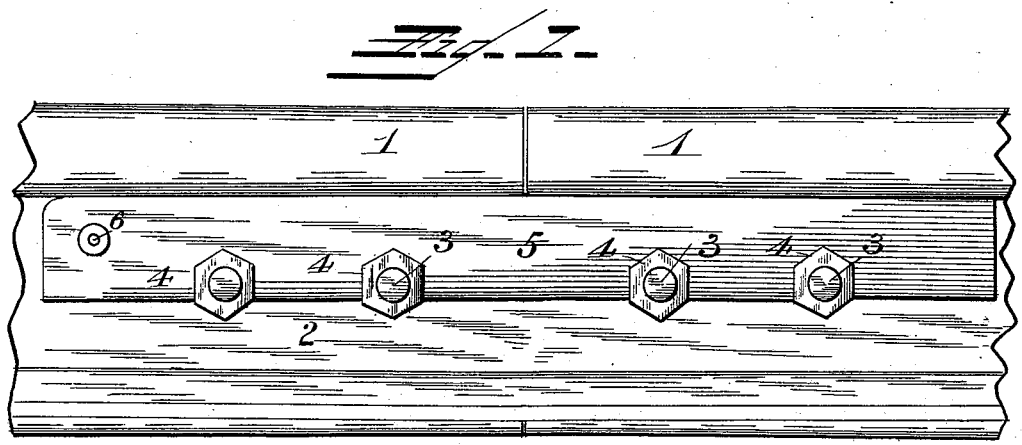
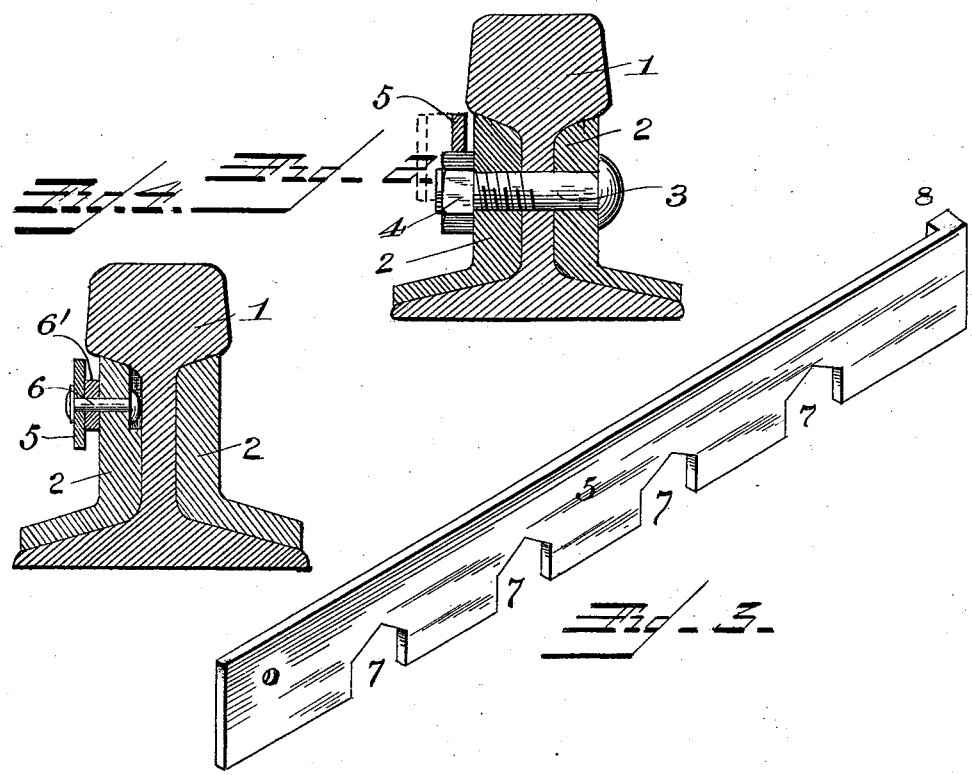
WITNESSES
INVENTOR
John W. Spriegel.
By T H B Willson
Attorney

UNITED STATES PATENT OFFICE.

JOHN W. SPRIEGEL, OF MAGAZINE, WEST VIRGINIA.

NUT-LOCK.

SPECIFICATION forming part of Letters Patent No. 545,742, dated September 3, 1895.

Application filed May 9, 1895. Serial No. 548,743. (No model.)

*To all whom it may concern:*

Be it known that I, JOHN W. SPRIEGEL, a citizen of the United States, residing at Magazine, in the county of Kanawha and State of West Virginia, have invented certain new and useful Improvements in Nut-Locks for Rail-Joints; and I do declare the following to be a full, clear, and exact description of the invention, such as will enable others skilled in the art to which it appertains to make and use the same.

My invention relates to nut-locks for rail-joints.

The object of the invention is to provide a positive and simple nut-lock which may be manufactured at a small cost and which may be easily applied.

With this object in view the invention consists of certain features of construction and combination of parts, which will be hereafter fully described and claimed.

In the accompanying drawings, Figure 1 is a side elevation of my improved nut-lock, showing it applied. Fig. 2 is a transverse sectional view of the same, showing in dotted lines the locking-bar sprung outward in the act of being applied, while in full lines the bar is shown in locked position with the nuts. Fig. 3 is a detailed perspective view of the locking-bar. Fig. 4 is a transverse sectional view through the rail, fish-plates, locking-bar, and rivet which pivots the locking-bar to the fish-plate.

In the drawings, 1 denotes the abutting ends of two rails; 2, the fish-plates; 3, the bolts, and 4 the nuts. The locking-bar 5 is secured to one of the fish-plates by a bolt or rivet 6, having an interposed washer 6', which spaces the bar from the fish-plate, so as to allow it to swing upward without contacting with the under side of the tread of the rail, while the head of the bolt or rivet is seated in a recess formed in the inner face of the fish-plate, so as to allow the said fish-plate to lie throughout its whole length against the web of the rail. Notches 7 are formed in the lower edge of the bar and are adapted to embrace and lock the nuts against turning. The free end of the bar has a lug 8 projecting upward therefrom, which fits under the tread and prevents the bar being accidentally jarred upward and releasing the nuts.

As shown in dotted lines in Fig. 2, the bar in being applied is sprung outward and when released will spring back with its notches engaging the nuts and its lug projecting under the tread of the rail, as shown in full lines in said figure, and in which position the nuts will be securely locked against turning.

The locking-bar may be manufactured at a small cost and may be easily applied to rails by simply drilling or casting one of the fish-plates with a hole for the rivet or bolt upon which the bar swings.

Having thus described my invention, what I claim, and desire to secure by Letters Patent, is—

The combination with the rails, the fish plates and the bolts and nuts, one of said fish plates having a recess formed in its inner face, of a spring locking bar, a bolt or rivet for pivoting said locking bar to one of the fish plates, the head of said bolt or rivet being seated in the aforesaid recess, and a washer upon said bolt or rivet interposed between the locking bar and fish plate, so as to allow the locking bar to swing upward past the rail tread, said locking bar being provided on one of its edges with notches to receive the nuts and having a laterally projected lug at its other end to spring under the tread of the rail and lock the bar against vertical movement, substantially as set forth.

In testimony whereof I affix my signature in presence of two witnesses.

JOHN W. SPRIEGEL.

Witnesses:
WM. L. SMITH,
J. C. WILSON.